(12) United States Patent
Vincent (10) Patent No.: US 8,330,575 B2
(45) Date of Patent: Dec. 11, 2012

(54) KEYLESS ACCESS SYSTEM AND METHOD FOR A TRUCK AND TRUCK EQUIPPED WITH SUCH A SYSTEM

(75) Inventor: Loïc Vincent, Venissieux (FR)

(73) Assignee: Renault Trucks, St. Priest (FR)

( * ) Notice: Subject to any disclaimer, the term of this patent is extended or adjusted under 35 U.S.C. 154(b) by 657 days.

(21) Appl. No.: 12/445,997

(22) PCT Filed: Oct. 31, 2006

(86) PCT No.: PCT/IB2006/004053
§ 371 (c)(1),
(2), (4) Date: Apr. 17, 2009

(87) PCT Pub. No.: WO2008/053274
PCT Pub. Date: May 8, 2008

(65) Prior Publication Data
US 2010/0039222 A1  Feb. 18, 2010

(51) Int. Cl.
*B60R 25/00* (2006.01)
*G08B 29/00* (2006.01)
*G05B 19/00* (2006.01)

(52) U.S. Cl. ........... 340/5.72; 340/5.1; 340/5.2; 340/5.8

(58) Field of Classification Search .................... 340/5.2, 340/5.8, 5.61, 5.72, 426.1, 539.25, 26.17
See application file for complete search history.

(56) References Cited

U.S. PATENT DOCUMENTS

| | | | |
|---|---|---|---|
| 4,083,424 A | 4/1978 | Von Den Stemmen et al. | |
| 5,532,521 A * | 7/1996 | Leininger | 307/10.2 |
| 5,640,139 A * | 6/1997 | Egeberg | 340/426.19 |
| 5,781,399 A | 7/1998 | Lanigan | |
| 6,338,534 B1 * | 1/2002 | Kee et al. | 303/89 |
| 6,982,626 B2 * | 1/2006 | Nedorezov | 340/5.71 |
| 7,034,683 B2 * | 4/2006 | Ghazarian | 340/568.1 |
| 7,119,709 B2 * | 10/2006 | Magner et al. | 340/426.36 |
| 7,184,767 B2 * | 2/2007 | Gandolfo | 455/435.2 |
| 7,243,007 B2 * | 7/2007 | Wilson et al. | 701/2 |
| 7,283,034 B2 * | 10/2007 | Nakamura et al. | 340/5.72 |
| 7,742,861 B2 * | 6/2010 | Lee | 701/50 |
| 2004/0027237 A1 | 2/2004 | Magner et al. | |
| 2005/0062344 A1 | 3/2005 | Holt et al. | |
| 2006/0284476 A1 * | 12/2006 | Choucair et al. | 303/7 |
| 2010/0007461 A1 * | 1/2010 | Lacour et al. | 340/5.61 |
| 2010/0321173 A1 * | 12/2010 | Magner et al. | 340/426.1 |

FOREIGN PATENT DOCUMENTS

WO  0144030 A  6/2001

OTHER PUBLICATIONS

International Search Report for corresponding International Application PCT/IB2006/004053.

* cited by examiner

*Primary Examiner* — Daniel Wu
*Assistant Examiner* — Mancil Littlejohn
(74) *Attorney, Agent, or Firm* — WRB-IP LLP (57) ABSTRACT

A keyless access system is provided for a truck including a tractor area and a cargo area provided with at least an access door. This system includes a main control unit located in the tractor area and adapted to interact with a customer identification device to selectively operate a control access arrangement which allows or prevents access to a driver cabin of the truck, a secondary control unit located in or near the cargo area and adapted to interact with the same customer identification device and to selectively operate an actuator which locks or unlocks the access door, and a bidirectional telecommunication arrangement between the main and secondary units.

18 Claims, 5 Drawing Sheets

KEYLESS ACCESS SYSTEM AND METHOD FOR A TRUCK AND TRUCK EQUIPPED WITH SUCH A SYSTEM

BACKGROUND AND SUMMARY

This invention concerns a keyless access system for a truck including, amongst others, a cargo area. This invention also concerns a truck equipped with such a system, a control unit to be used in such a system and a method to be implemented with such a system.

Keyless systems have been known to allow an easy access to a personal vehicle because the user does not have to open a door with a key in so far as a customer identification device or CID, which is often in the form of a remote controller or an electronic card or tag, is recognized by the system when the user comes close to a door or a vehicle.

An active electronic keyless access system is a system where a user actuates his remote controller, e.g. by pressing a button, to unlock a door of the vehicle. A passive keyless access system is a system where the user has a customer identification device which can exchange information with an onboard control unit without being manually actuated by the user. This invention applies to an active keyless access system and to a passive keyless access system.

As disclosed in U.S. Pat. No. 5,532,521, keyless systems have been used to control access to a cargo zone of a truck, which facilitates the work of the driver. When the driver wants to access the cargo zone, he must actuate a transmitter to generate a signal processed to open a rear access door. When exiting the storage area, the driver must tap a switch to close and lock the door. With this system, the driver must remember to open the rear door of the truck before leaving his seat and must not forget to close the door when re-entering the cabin. This is tedious, especially for vehicles which are used to deliver goods in several locations, like stores, in a city.

On the other hand, keyless access systems have been designed in order to control access and, in some instances as in FR-A-2 815 149, control an auxiliary equipment like an audio device. Such systems are not adapted for trucks. No known systems take into account the fact that the driver of a truck might wish to exit the cabin and to go to a rear door in order to access a cargo area, without having to remember to actuate a transmitter before leaving the cabin or a switch before leaving the cargo area.

The invention aims at providing a keyless access system which facilitates the work of a driver by providing an easy, automatic and secure access to the cargo area of a truck.

To this purpose, the invention concerns a keyless access system for a truck including a tractor area and a cargo area provided with at least an access door, this system comprising:
- a main control unit located in the tractor area and adapted to interact with a customer identification device to selectively operate access means which allow or prevent access to a driver cabin of the vehicle,
- a secondary control unit located in or near the cargo area and adapted to interact with the same customer identification device and to selectively operate an actuator which locks or unlocks the access door, and
- bi-directional telecommunication means between the main unit and the secondary unit.

Thanks to the invention, the secondary unit can be used to lock or unlock the access door to the cargo area depending on the fact that a person standing near this door and outside the truck has or not a customer identification device, hereafter called "CID", known by the system as valid to access the cargo area.

According to further aspects of the invention, this system might incorporate one or several of the following features:
- The communication means between the main and secondary units are wireless.
- The secondary unit is adapted to interact with a CID in order to collect data from this device and to send some information representative of these data to the main unit which is adapted to determine, on the basis of the information received from the secondary unit, if the access door is to be opened for this CID and, if such is the case, to send to the secondary unit, a clearance signal for this door.
- Each main or secondary unit is connected to at least an activation switch, at least a lock actuator, at least an antenna adapted to send an activation signal towards a CID and/or to receive a response signal from the CID. Preferably, each unit is connected to a low frequency antenna adapted to emit the activation signal towards a CID and to a high frequency antenna adapted to receive a response signal from the CID.
- The secondary control unit comprises means to collect data from a CID, means to send to the main access unit a signal representative of the data collected from the CID1 means to receive from the main control unit a clearance signal and means to selectively operate, upon reception by the receiving means of a clearance signal from the main unit, an actuator which unlocks an access door to a cargo area of the vehicle.
- Independent power supply means are provided, in or near the cargo area, for the secondary access unit.
- The system is a passive keyless access system.

The invention also concerns a truck including a tractor area and a cargo area provided with at least an access door, this vehicle being provided with a keyless access control system as explained here-above.

According to a first embodiment, such a truck includes a tractor and a trailer, said main unit being mounted on the tractor whereas the secondary unit is mounted on the trailer. According to another embodiment, the truck comprises a cargo structure fixed on a frame belonging to a tractor, the main unit being mounted on the tractor, whereas the secondary unit is mounted on the structure.

The invention also concerns a control unit which can be used as a secondary unit in a system as mentioned here-above. This unit comprises means to collect data from a CID, means to send to a remotely located other control unit a signal representative of the data collected from the CID, means to receive from this other unit a clearance signal and means to selectively operate, upon reception by the receiving means of a clearance signal from the other unit, an actuator which unlocks an access door to a cargo area of a truck.

Finally, the invention concerns a method which can be implemented with the system mentioned here-above in order to control access to a cargo area of a truck. This method comprises at least the following steps of:
a)—detecting an unlock request of an access door to a cargo area of the vehicle,
b)—sending, from a first control unit located in or near the cargo area, a challenge signal towards a CID,
c)—receiving a signal corresponding to a response of the device,
d)—verifying, in a main control unit located in a tractor area of the vehicle, if the received signal corresponds to a valid identification code,
e)—if the received signal corresponds to a valid identification code, sending from the main unit to the first unit, a clearance signal, f)—when a clearance signal is received in the first unit from the main unit, sending an actuation signal to an actuator which mechanically unlocks the access door.

According to a first approach, before step c), the response signal of the CID is received by the first unit and then a signal representative of this response signal is sent by the first unit to the main control unit. Alternatively, during step c), the response signal of the CID is received directly by the main control unit.

Advantageously, the signal transmission between the first and main units is wireless. According to an advantageous aspect of the invention, the challenge signal is a low frequency signal whereas the response signal is a high frequency signal and communication between the first and main units takes place in high frequency mode.

BRIEF DESCRIPTION OF THE DRAWINGS

The invention will be better understood on the basis of the following description which is given in correspondence with the annexed figures and as an illustrative example, without restricting the object of the invention. In the annexed figures.

DETAILED DESCRIPTION

Figure 1:
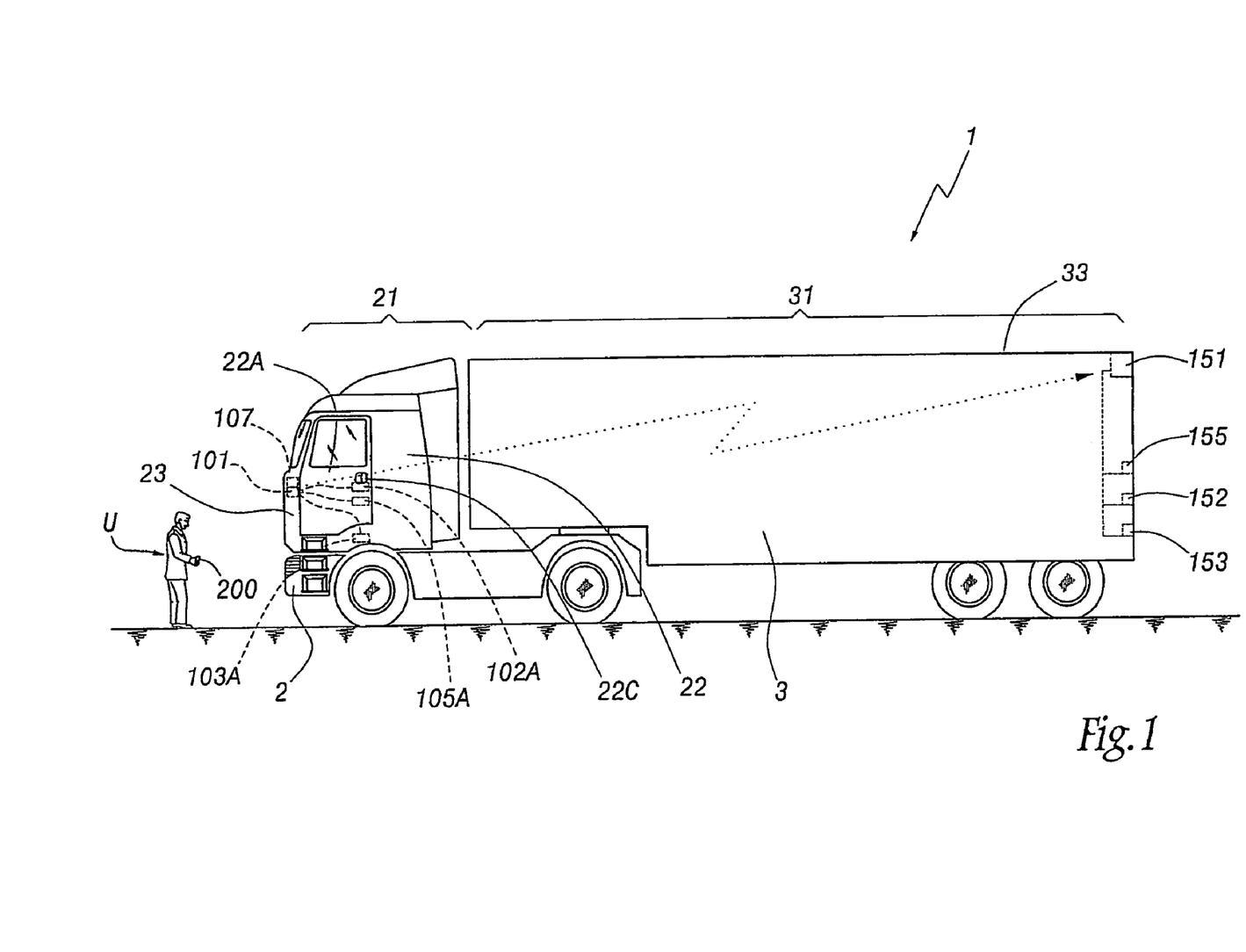
FIG. 1 is a schematic side view of an truck incorporating the invention.
Figure 2:
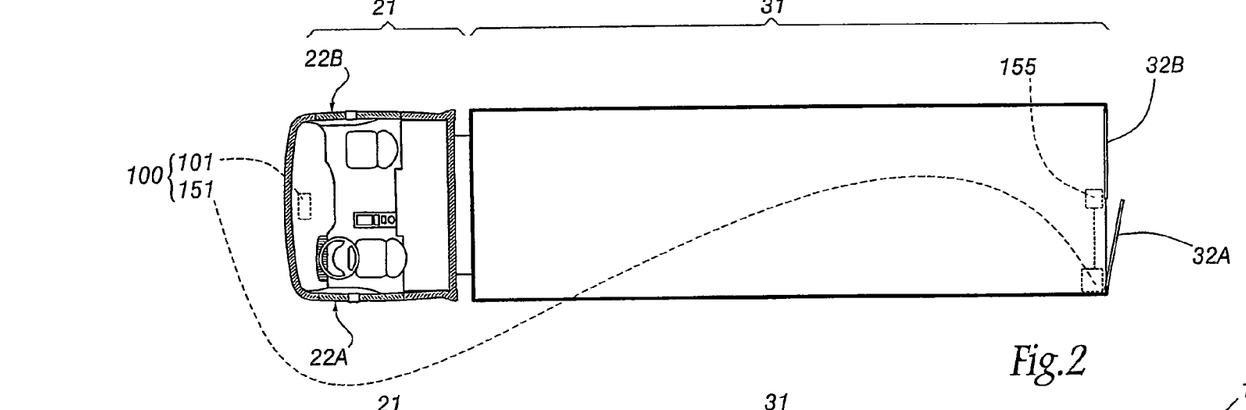
FIG. 2 is a top view of the vehicle of FIG. 1, the roof of the cabin being taken away.

The truck 1 represented on FIGS. 1 and 2 includes a tractor 2 and a trailer 3 hooked onto the tractor and defining a cargo area 31 where goods to be transported can be stored. The tractor 2 defines a tractor area 21 where no goods are to be stored and which comprises, amongst others, the driver cabin 22 and the engine compartment 23 of tractor 2. Cabin 22 is provided with two lateral doors 22A and 22B, door 22A being located next to the driver's seat.

A keyless access system 100 is provided to control access to cabin 22 for a user U bearing a customer identification device or CID 200. This CID is a small dimension electronic device, in the form of a tag or a, credit card or somewhat bigger, which is adapted to emit, when receiving a predetermined challenge signal, a response signal comprising an alphanumerical identification sequence which is specific to each CID. System 100 includes a main unit 101 which is fed with electrical power from the main electrical circuit 25 of tractor 2. Unit 101 is connected to an activation switch 102A located near the handle 22C of driver's door 22A, this switch being suitable to send to unit 101 a signal Si when handle 22C is being touched by user U. Unit 101 is also connected to a low frequency antenna 103A located on the driver's side of cabin 22. When unit 101 receives signal S-i, unit 101 computes an alphanumerical sequence. Then, it sends to antenna 103A an actuation signal S2 corresponding to this sequence. Then, antenna 103A sends a low frequency radio challenge signal S3 which also corresponds to the computed sequence and which is supposed to be received by CID 200. When it receives signal S3, CID 200 calculates a response signal S4 which is sent as a high frequency radio signal and received by a high frequency antenna 104 connected to unit 101. Signal S4 received by antenna 104 is then verified by unit 101 and, if it is found that CID 200 permits access to cabin 22, unit 101 sends a signal S5 to an actuator 105A which mechanically unlocks door 22A. Unit 101 is also connected to an activation switch 102B, a low frequency antenna 103B and an actuator 105B located on the passenger's door 22B side and which are supposed to be used as explained here-above when a user wants to access cabin 22 by the passenger's side.

According to an optional aspect of the invention, unit 101 is associated with a passive go unit 110 which is capable of recognizing CID 200 when this device is within cabin 22 in order to allow starting of the engine and driving of tractor 2, without having to use a mechanical key. Thanks to unit 101, the driver can very easily access cabin 2, as long as he has with him his CID 200, either in his hand, or in his pocket or in a bag that he carries with him.

A secondary unit 151 is mounted in area 31, close to the roof 33 of trailer 3, in the vicinity of its back doors 32A and 32B. This secondary unit is connected to an activation switch 152, a low frequency antenna 153, a high frequency antenna 154 and an actuator 155, in a way similar to the connection between items 101 to 105.

Unit 151 is also connected to a battery 156 located in its vicinity and providing electrical current when necessary.

Unit 151 could be located elsewhere in or near area 31, on trailer 3, although one advantage of having unit 151 near access doors 32A and 32B is to be able to use short range communication means, like low frequency antenna 153, between unit 151 and a CID 200.

Bi-directional wireless communication means are respectively associated to unit 101, as a first module 107, and to unit 151, as a second module 157. For the sake of security, and in order to take into account that a trailer may be used with different tractors, unit 151 does not store tile confidential information relating to tile fact that one CID authorizes or not access to the cargo area 31 of a truck 1. However, unit 151 is used to determine whether or not a user having a CID may access this area through doors 32A and 32B. The left part of FIG. 4 corresponds to the steps of the access control method performed by unit 101 and its associated equipments when a user tries to access zone 31, whereas the central part corresponds to the steps performed by unit 151 and the associated equipments and the right part corresponds to the steps performed by CID 200. The last digit of their references corresponds to the chronological order of the method steps. The two first digits correspond to the parts by which they are performed (10 for unit 101 and its associated equipments in area 21, 15 for unit 151 and its associated equipments in area 31 and 20 for CID 200).

Figure 4:
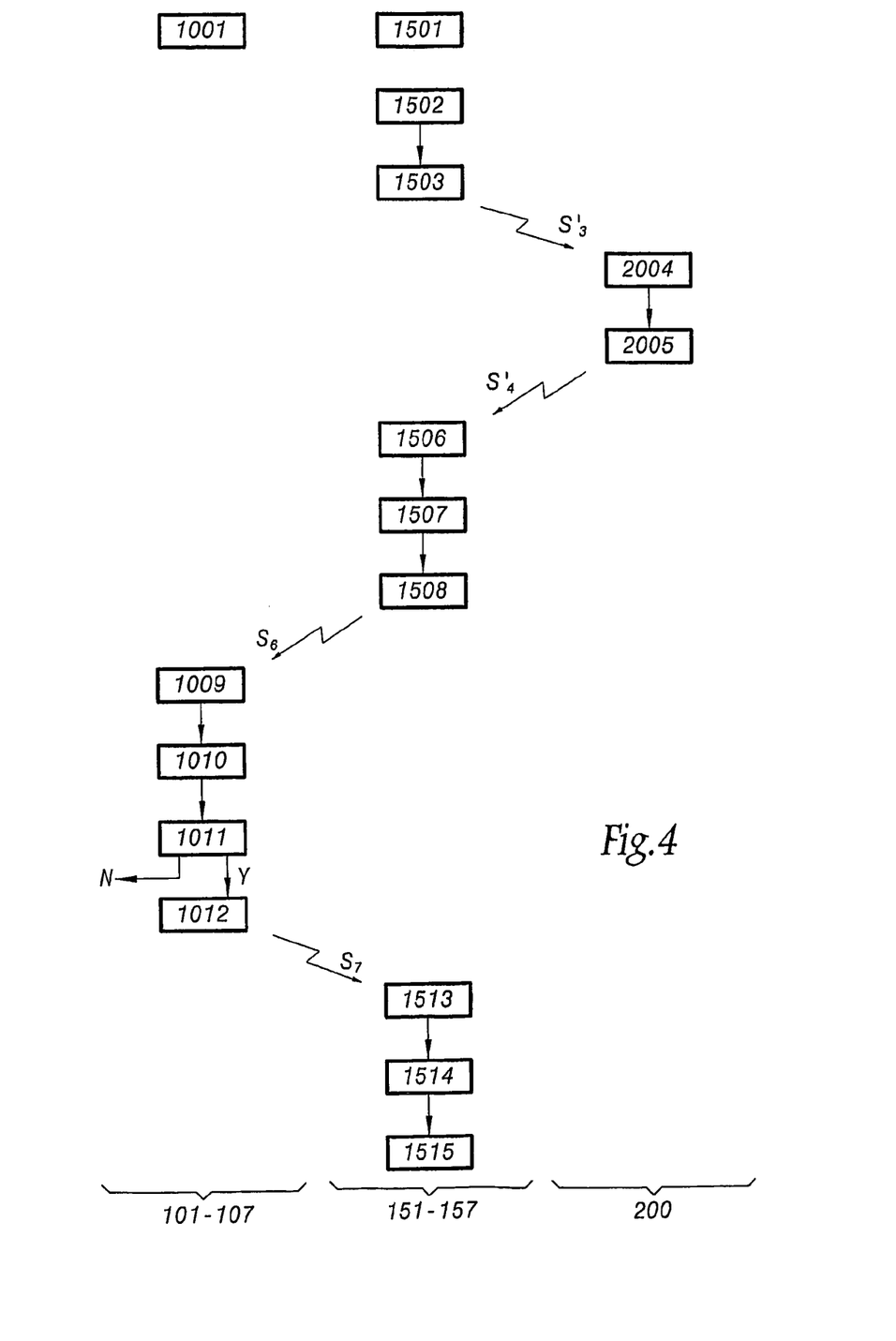
FIG. 4 is a block diagram of a method implemented with the system of FIG. 3.

At the beginning, unit 101 is in sleeping mode as shown by step 1001, whereas unit 151 is also in sleeping mode, as shown by step 1501. When a user wants to open one of the back doors 32A or 32B1 he touches a corresponding handle which is detected by actuation switch 152 in a first active step 1502 where a signal S'i goes from switch 152 to unit 151.

Thereafter, in a further step 1503, unit 151 computes a challenge signal in the form of a first code or CODE 1 and a random number N. This calculated signal is forwarded to antenna 153 in an activation signal S'2 and emitted as a challenge signal S'3 towards the CID 200 of the user.

Upon reception of signal S'3, CID 200, which knows CODE 1, computes random number N in a first step 2004 and then calculates in a further step 2005 a response signal which is a function of the same number N and a code specific to CID 200, noted as CODE 2. Signal S'4 includes, amongst other, some identification data of CID 200.

At the end of step 2005, CID 200 sends a high frequency response signal S'4, including CODE 2 and the computed number N, which is received by antenna 154 in a further step 1506.

Actually, signal S'4 might be the same as or different from signal S4.

Response signal S'4 is then forwarded to unit 151 in a step 1507. Then, in a further step 1508, unit 151 uses module 157 to re-direct signal S'4, as a signal Se, towards module 107 associated with unit 101. According to an alternative embodiment of the invention, antenna 154 and module 157 can be the same component. In other words, a single antenna can be used to receive signal S'4 and send signal S6.

According to an alternative embodiment of the invention, signal S6 re-directed by unit 151 towards unit 151 might be different from the signal S'4 received from CID 200. In particular, signal S6 may incorporate only a part of signal S'4.

In all embodiments, number N, which is generated by unit 151 each time it is actuated, is incorporated within signal S6, so that unit 101 can extract the value of CODE 2 from signal S6. Therefore, unit 101 indirectly extracts CODE 2 from signal S'4| as it does for signal S4.

Signal S6 is received by module 107 in a step 1009. It is then transferred to unit 101 in a further step 1010. In step 1011, unit 101 verifies if the information included in signal S6 correspond to a CID which permits opening of doors 32A and 32B.

If this is not the case, the method stops and no activation of actuator 155 takes place.

If the information collected from unit 151 corresponds to an authorized CID, unit 101 activates, in a further step 1012, module 107 to send a clearance signal S7 towards module 157. This signal is received by module 157 in step 1513 and forwarded, in step 1514, to unit 151. When it receives the clearance signal S7, unit 151 sends to actuator 155 an actuation signal S'5 so that actuator 155 mechanically unlocks doors 32A and 32B in step 1515.

The low frequency used for transmitting signals S3 and S'3 can be of 125 kHz, whereas the high frequency used for transmitting signals S4, S'4, S6 and S7 is 433 MHz. Protocols like WIFI and Bluetooth can be used for the high frequency communication between modules 107 and 157. The use of low frequency antennas 103A, 103B and 153 for signals S3 and S'3 makes it possible to precisely tune the maximum distance, or reach, of the communication between unit 101 or 151 and CID 200. Therefore, there exist few risks that a door is unlocked when the authorized user is still far away from this door. On the contrary, the high frequency signals S4, S'4, S6 and S7 have a longer reach.

Figure 5:
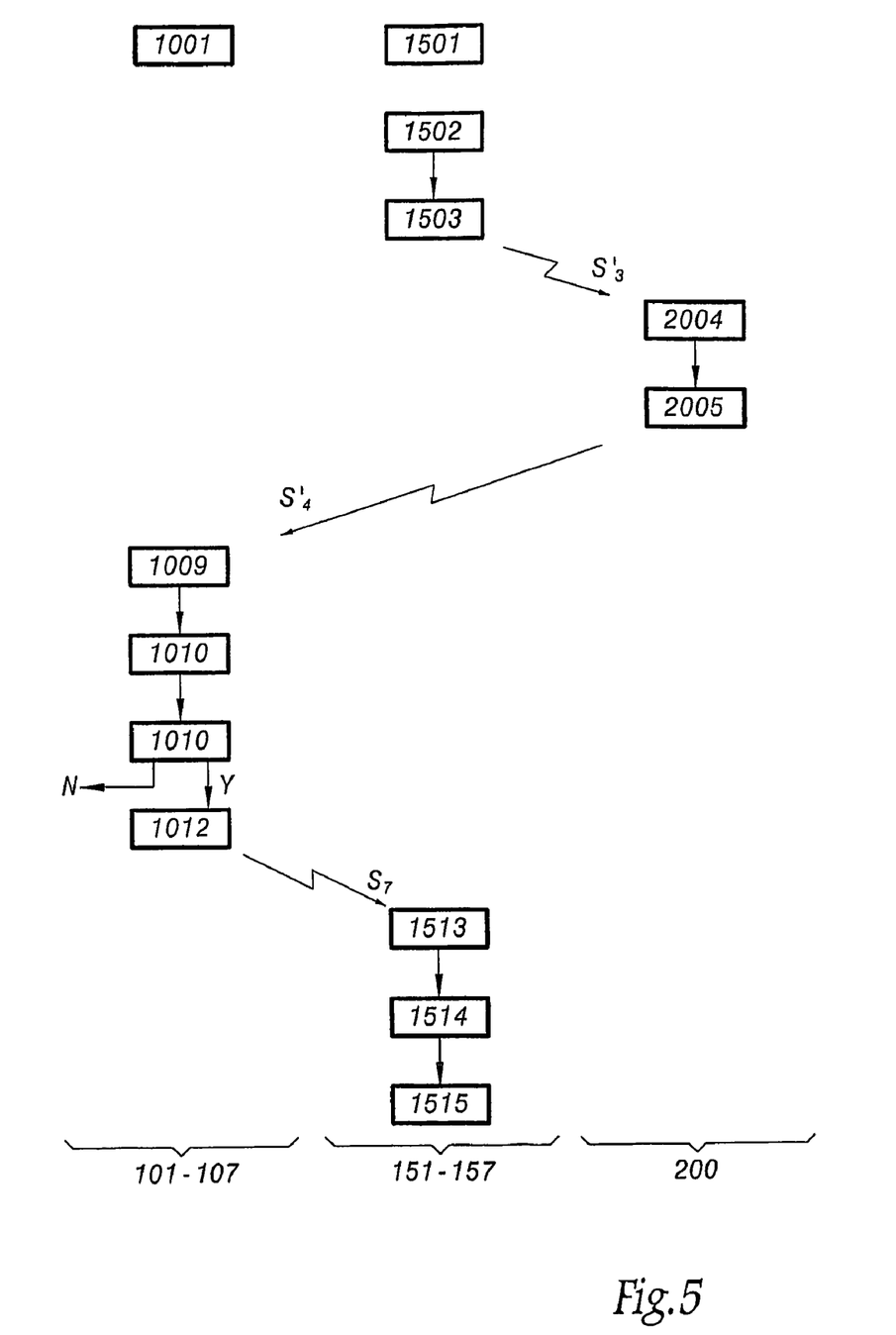
FIG. 5 is a view similar to FIG. 4 for another method implemented with the system of FIG. 3.

In the second embodiment of the invention represented on FIG. 5, the same steps as the ones mentioned here-above have the same references. Steps 1001, 1501, 1502, 1503, 2004 and 2005 are identical to the same steps on FIG. 4. In step 2005, signal S'4 is sent directly to antenna 104 where it is received in step 1009. It is then transferred to unit 101 in step 1010 and steps 1011, 1012 and 1513 to 1515 are identical to the equivalent steps in FIG. 4.

Figure 3:
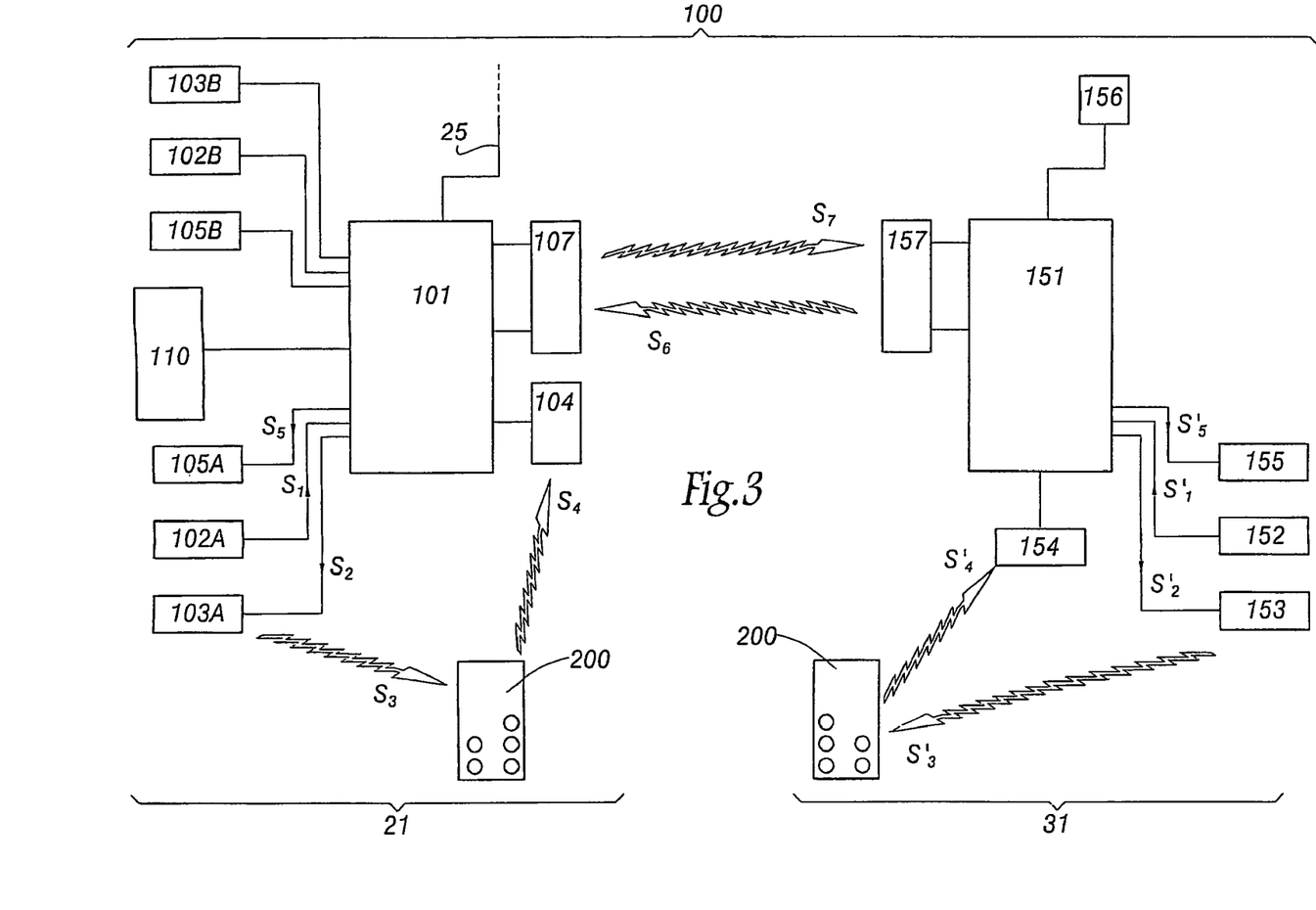
FIG. 3 is a schematic view of a keyless access system used in the vehicle of FIGS. 1 and 2.

The invention is of particular interest for a truck provided with a trailer, as shown on FIGS. 2 and 3. However, as shown on FIG. 6, it can also be used for a truck 1 whose cabin 22 is supported on a frame 24 on which a cargo structure 34 is fixably mounted. Here again, a control access system including, amongst others, a main control unit 101 and a secondary control unit 151 can be used.

Figure 6:
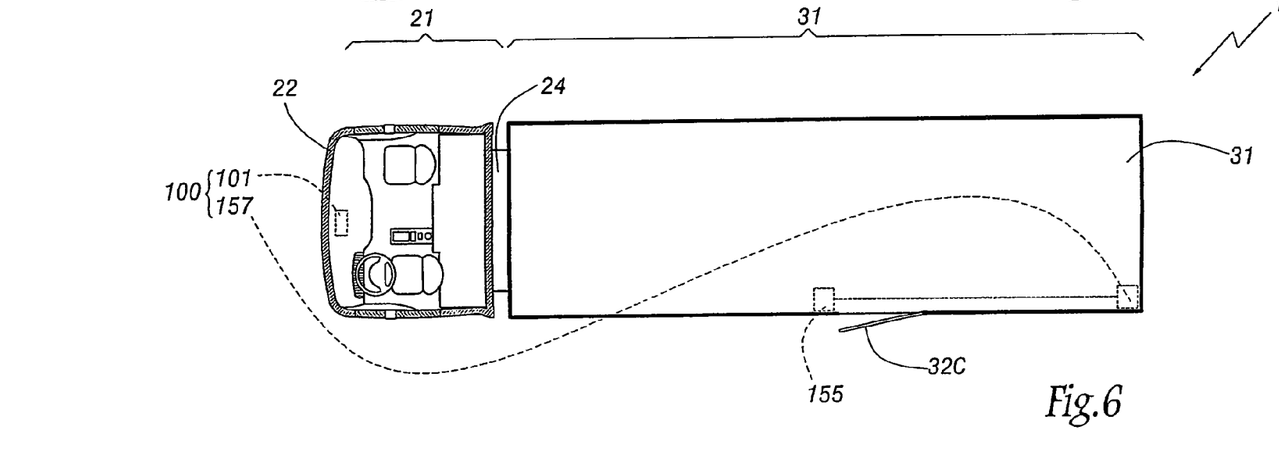
FIG. 6 is a top view similar to FIG. 2 for another truck incorporating the invention.

As shown on FIG. 6, the secondary control unit might be used to control access to a cargo area 31 via a side door 32C of the truck.

The invention has been represented with the secondary unit 151 located in the cargo area 31 of a truck. In fact, this unit can also be located in the vicinity of this area, provided that it is close enough to the door or doors to be able to send, via its antenna 153, signal S'3 to CID 200 and to receive, via its antenna 154, signal S4 from CID 200.

In the first embodiment, the fact that communication between modules 107 and 157 is wireless is of particular interest since no specific precaution must be taken when the trailer 3 is hooked onto a tractor 2 or when it is separated from this tractor.

One can consider a connection between the main and secondary units via wires, in particular for a truck with a rigid structure as represented on FIG. 6.

The invention has been described when used with a passive keyless access system. However, it may also be used with an active keyless access system. In such a case, activation switches 102A1 102B and 152 do not belong to system 100.

List Of References
1 truck
2 tractor
21 tractor area
22 driver cabin
22A driver door
22B passenger door
22C handle
23 engine compartment
24 frame
25 electrical circuit
3 trailer
31 cargo area
32A back door
32B back door
32C side door
33 roof
34 cargo structure
100 system
101 main control unit
102A activation switch
102B activation switch
103A low frequency antenna
103B low frequency antenna
104 high frequency antenna
105A actuator
105B actuator
107 communication module
110 passive go unit
151 secondary control unit
152 activation switch
153 low frequency antenna
154 low frequency antenna
155 actuator
156 battery 157 communication module
200 customer identification device or CID
1001 step in tractor area 21
1009 step in tractor area 21
1010 step in tractor area 21
1011 step in tractor area 21
1012 step in tractor area 21
1501 step in or near cargo area 31
1502 step in or near cargo area 31
1503 step in or near cargo area 31
1506 step in or near cargo area 31
1507 step in or near cargo area 31
1508 step in or near cargo area 31
1513 step in or near cargo area 31
1514 step in or near cargo area 31

2004 step in CID 200
2005 step in CID 200
U user
Si signal
S'i signal
S2 signal
S'2 signal
S3 challenge signal
S'3 challenge signal
S4 response signal
S 4 response signal
S5 actuation signal
S's actuation signal
S6 redirected signal
S7 clearance signal

The invention claimed is:

1. A keyless access system suitable for use with a truck, the truck including a tractor area and a cargo area, the cargo area being provided with at least an access door, wherein the system comprises:
   a main control unit adapted to be located in the tractor area and configured to interact with a customer identification device to selectively operate control access means which allow or prevent access to a driver cabin of the tractor area of the truck,
   a secondary control unit adapted to be located in or near the cargo area and configured to interact with the same customer identification device in order to collect data from the customer identification device and to selectively operate an actuator which locks or unlocks the access door, and
   bi-directional telecommunication means between the main and secondary control units, wherein the secondary control unit is configured to send to the main control unit some information representative of data collected from the customer identification device and the main control unit is configured to send to the secondary control unit a clearance signal to unlock the access door.

2. System according to claim 1, wherein the telecommunication means is wireless.

3. System according to claim 1, wherein the secondary control unit is configured to determine, on the basis of the information received from the secondary control unit, if the access door is to be opened for this customer identification device and, if such is the case, to send to the secondary control unit the clearance signal to unlock the access door.

4. System according to claim 1, wherein each main or secondary control unit is connected to:
   at least an activation switch,
   at least a lock actuator,
   at least an antenna adapted to emit an activation signal towards a customer identification device and/or to receive a response signal from the customer identification device.

5. System according to claim 4, wherein each main or secondary control unit is connected to:
   at least a low frequency antenna adapted to emit the activation signal towards a customer identification device, and
   at least a high frequency antenna adapted to receive a response signal from the customer identification device.

6. System according to claim 1, wherein the secondary control unit comprises:
   means to collect data from a customer identification device,
   means to send to the main control unit a signal representative of the data collected from the device,
   means to receive from the main access control unit a clearance signal, and
   means to selectively operate, upon reception by the receiving means of a clearance signal from the main control unit, an actuator which unlocks an access door to a cargo area of the truck.

7. System according to claim 1, wherein independent power supply means is provided in or near the cargo area for the secondary control unit.

8. System according to claim I, wherein the system is a passive keyless access system.

9. A truck including a tractor area and a cargo area provided with at least an access door, wherein it is provided with a keyless access system according to claim 1.

10. Truck according to claim 9, wherein it includes a tractor and a separable trailer, the main control unit being mounted on the tractor whereas the secondary control unit is mounted on the trailer.

11. Truck according to claim 9, wherein it comprises a cargo structure fixed on a frame belonging to a tractor, the main control unit being mounted on the tractor whereas the secondary control unit is mounted on the structure.

12. A control unit to be used in a system according to claim 1, wherein it comprises:
   means to collect data from a customer identification device,
   means to send to a remotely located other access control unit a signal representative of the data collected from the customer identification device,
   means to receive from the other access control unit a clearance signal, and
   means to selectively operate, upon reception by the receiving means of a clearance signal from the other access control unit, an actuator which unlocks an access door to a cargo area of a truck.

13. A method for controlling keyless access to a cargo area of a truck through at least an access door for a user having a customer identification device, comprising:
   a) detecting an unlock request of the access door,
   b) sending, from a first control access unit located in or near the cargo area, a challenge signal towards the customer identification device,
   c) receiving a signal corresponding to a response of the customer identification device,
   d) verifying, in a main control unit located in a tractor area of the vehicle, if the received signal corresponds to a valid identification code,
   e) if the received signal corresponds to a valid identification code, sending from the main control unit to the first control access unit a clearance signal, and
   f) when a clearance signal is received in the first control access unit from the main control unit, sending an actuation signal to an actuator which mechanically unlocks the access door.

14. Method according to claim 13, wherein before step c), a response signal of the customer identification device is received by the first control access unit and then a signal representative of this response signal is sent by the first unit to the main control unit.

15. Method according to claim 13, wherein during step c), a response signal is received directly by the main control unit.

16. Method according to claim 13, wherein signal transmission between the first control access unit and the main control unit is wireless.

17. Method according to claim 13, wherein the challenge signal is a low frequency signal, whereas the response signal is a high frequency signal and communication between the first control access unit and the main control unit takes place in high frequency mode.

18. Method according to claim 13, wherein the cargo area is separable from the tractor area or built separately from a tractor of the vehicle and attached to a frame of the tractor.

* * * * *